(12) United States Patent
Park et al.

(10) Patent No.: US 12,252,083 B2
(45) Date of Patent: Mar. 18, 2025

(54) SYSTEM FOR AND METHOD OF CONTROLLING IN-VEHICLE ENVIRONMENT BASED ON PURPOSE OF USING VEHICLE

(71) Applicant: Korea Automotive Technology Institute, Cheonan-si (KR)

(72) Inventors: Sun Hong Park, Cheonan-si (KR); Dong Woon Ryu, Cheonan-si (KR); Young Dal Oh, Cheonan-si (KR); Jin Hae Yae, Cheonan-si (KR); Hun Lee, Cheonan-si (KR); Dong Han Lee, Cheonan-si (KR)

(73) Assignee: Korea Automotive Technology Institute, Cheonan-si (KR)

( * ) Notice: Subject to any disclaimer, the term of this patent is extended or adjusted under 35 U.S.C. 154(b) by 218 days.

(21) Appl. No.: 17/889,749

(22) Filed: Aug. 17, 2022

(65) Prior Publication Data

US 2023/0055693 A1 Feb. 23, 2023

(30) Foreign Application Priority Data

Aug. 18, 2021 (KR) .......... 10-2021-0108462
Dec. 23, 2021 (KR) .......... 10-2021-0186334

(51) Int. Cl.
*B60R 16/037* (2006.01)
*B60J 3/04* (2006.01)
*B60Q 3/80* (2017.01)
*G06V 20/59* (2022.01)

(52) U.S. Cl.
CPC .......... *B60R 16/0373* (2013.01); *B60J 3/04* (2013.01); *B60Q 3/80* (2017.02); *G06V 20/597* (2022.01)

(58) Field of Classification Search
CPC .......... B60R 16/0373; B60J 3/04; B60Q 3/80; B60Q 9/00; B60Q 2900/40; B60Q 3/731; G06V 20/597; G06V 20/593
See application file for complete search history.

(56) References Cited

U.S. PATENT DOCUMENTS

2018/0251122 A1* 9/2018 Golston ............... B60W 40/08
2020/0130573 A1 4/2020 Ito
(Continued)

FOREIGN PATENT DOCUMENTS

| KR | 10-2019-0119226 A | 10/2019 |
| KR | 10-2020-0027280 A | 3/2020 |
| KR | 10-2020-0036114 A | 4/2020 |

(Continued)

*Primary Examiner* — Aniss Chad
*Assistant Examiner* — Chase L Cooley
(74) *Attorney, Agent, or Firm* — Sughrue Mion, PLLC

(57) ABSTRACT

Proposed are a system for and a method of controlling an in-vehicle environment based on the purpose of using a vehicle. The system includes a recognition unit configured to acquire behavioral information of an occupant, in-vehicle voice information, and seat-position information, a determination unit configured to determine a behavioral pattern of the occupant or the purpose of using a vehicle, using the information transferred through the recognition unit, and a controller configured to control at least one of in-vehicle illumination and a window transparency level according to the purpose of using the vehicle or according to a user's preference.

15 Claims, 13 Drawing Sheets

(56) References Cited

U.S. PATENT DOCUMENTS

2020/0175400 A1* 6/2020 Mori ................. G06Q 30/0265
2020/0346602 A1 11/2020 Yokoi

FOREIGN PATENT DOCUMENTS

| KR | 10-2020-0087320 A | 7/2020 |
| KR | 10-2020-0139060 A | 12/2020 |
| KR | 10-2020-0145962 A | 12/2020 |
| KR | 10-2021-0014727 A | 2/2021 |
| KR | 10-2021-0072184 A | 6/2021 |
| KR | 10-2021-0140816 A | 11/2021 |

* cited by examiner

SYSTEM FOR AND METHOD OF CONTROLLING IN-VEHICLE ENVIRONMENT BASED ON PURPOSE OF USING VEHICLE

CROSS-REFERENCE TO RELATED APPLICATIONS

This application claims priority to and the benefit of Korean Patent Application No. 10-2021-0108462, filed on Aug. 18, 2021, and Korean Patent Application No. 10-2021-0186334, filed on Dec. 23, 2021, the disclosures of which are incorporated herein by reference in their entirety.

BACKGROUND

1. Technical Field

The present disclosure relates to a system for and a method of controlling an in-vehicle environment based on the purpose of using a vehicle.

2. Related Art

In the related art, in-vehicle environment, such as illumination and a window transparency level, is controlled according to active input of a command (for example, button input, touch input, voice input, gesture input, or the like) by an occupant riding in a vehicle, a state change (facial expression, eye blinking, or the like), or an illumination-level environment inside and outside the vehicle.

In the related art, the occupant riding in the vehicle directly inputs a command, or a change in a state of a driver and an environment condition inside and outside the vehicle are monitored. However, there is a limit in that it is not possible to automatically identify the purpose of using the vehicle and automatically perform the optimal indoor environment control that needs to be provided to meet the purpose of using the vehicle.

SUMMARY

An object of the present disclosure, which is made to solve the above-mentioned problem, is to provide a system for and a method of controlling an in-vehicle environment, the method being capable of automatically adjusting in-vehicle illumination or a window transparency level according to the purpose for which an occupant riding in a vehicle uses the vehicle, by recognizing the purpose of using the vehicle and building personalization data.

According to an aspect of the present disclosure, there is provided a system for controlling an in-vehicle environment based on the purpose of using a vehicle, the system including: a recognition unit configured to acquire behavioral information of an occupant, in-vehicle voice information, and seat-position information; a determination unit configured to determine a behavioral pattern of the occupant or the purpose of using a vehicle, using the information transferred through the recognition unit; and a controller configured to control at least one of in-vehicle illumination and a window transparency level according to the purpose of using the vehicle.

In the system, the recognition unit may analyze an in-vehicle image and may acquire the behavioral information of the occupant including at least one of an age of the occupant, the gender of the occupant, whether or not the occupant wears accessories, a motion of the occupant, a posture of the occupant, and a facial expression of the occupant, and the determination unit may learn the behavioral information and may build personalization data.

In the system, the recognition unit may acquire the in-vehicle voice information including at least one of voice, ambient noise, and music, using a voice recognition module, and the determination unit may learn the in-vehicle voice information and may build personalization data.

In the system, the recognition unit may acquire the seat-position information including at least one of a position, a rotational angle, and a tilting angle of a seat, and the determination unit may learn the seat-position information and may build personalization data.

In the system, the recognition unit may further acquire information on the purpose of using the vehicle, the information being set on a per-time zone basis and on a per-path section basis, and build personalization data using information on the purpose of using the vehicle.

In the system, in a case where the controller controls the in-vehicle illumination, the controller may control the in-vehicle illumination using situational standard-based illumination-level information or preferred-illumination-level information.

In the system, the controller may control an illumination level for the in-vehicle illumination, considering a behavioral area of the occupant and a distance between an illumination device and the behavioral area.

In the system, in a case where the controller controls the window transparency level, the controller may control the window transparency level on the basis of each purpose of using the vehicle, considering already-acquired usage satisfaction-level information.

According to an aspect of the present disclosure, there is provided a method of controlling an in-vehicle environment based on the purpose of using a vehicle, the method including: acquiring behavioral information of an occupant, in-vehicle voice information, and seat-position information; determining a behavioral pattern of the occupant or the purpose of using a vehicle using the information acquired in the acquiring; and controlling at least one of in-vehicle illumination and a window transparency level according to the purpose of using the vehicle that is determined in the determining.

In the method, in the acquiring, personalization data may be built by analyzing an in-vehicle image and acquiring the behavioral information of an occupant including at least one of an age of the occupant, the gender of the occupant, whether or not the occupant wears accessories, a motion of the occupant, a posture of the occupant, and a facial expression of the occupant and by acquiring the in-vehicle voice information including at least one of voice, ambient noise, and music, using a voice recognition module and acquiring the seat-position information including at least one of a position, a rotational angle, and a tilting angle of a seat.

In the method, in the determining, the purpose of using the vehicle may be determined using history information that is already acquired on a per-time basis and on a per-path section basis.

In the method, in the controlling, in a case where the in-vehicle illumination is controlled, the in-vehicle illumination may be controlled using situational standard-based illumination-level information or preferred-illumination-level information.

In the method, in the controlling, an illumination level for the in-vehicle illumination may be controlled, considering a behavioral area of the occupant and a distance between an illumination device and the behavioral area.

In the method, in the controlling, the in-vehicle illumination may be controlled, considering outside-illumination level information and setting information on the window transparency level.

In the method, in the controlling, in a case where the window transparency level is controlled, the window transparency level may be controlled on the basis of each purpose of using the vehicle, considering already-acquired usage satisfaction-level information.

According to the present disclosure, the purpose for which the occupant riding in the vehicle uses the vehicle, or the occupant's preference is recognized by unitizing an image, voice, spatial information, and the personalization data is built. Then, the in-vehicle illumination or the window transparency level are automatically adjusted according to the purpose of using the vehicle. Thus, the effect of minimizing the fatigue of the occupant riding in the vehicle and improving the occupant's satisfaction is provided.

The present disclosure is not limited to the above-mentioned effect. From the following description, an effect not mentioned above would be definitely understandable to a person of ordinary skill in the art.

DETAILED DESCRIPTION

The above-mentioned object, an additional object, an advantage, and a feature of the present disclosure, and methods of achieving these would be apparent from embodiments of the present disclosure that will be described in detail below referring to the accompanying drawings.

However, the present disclosure is not limited to the embodiments disclosed below and would be practiced in various different forms. The below-disclosed embodiments are provided only to make the object, the configuration, the effect of the present disclosure understandable to a person of ordinary skill in the art to which the present disclosure pertains. The scope of the present disclosure should be only defined in the claims.

The terms used in the present specification is for describing the embodiments and are not intended as imposing any limitation on the present disclosure. Unless specified otherwise through the present specification, a singular noun or a singular noun phrase may have a plural meaning. The terms "comprise" and/or "comprising" used in the present specification are intended to indicate that a named constituent element, step, operation, and/or element is present, without precluding the presence or addition of one or more other constituent elements, steps, operations, and/or elements.

Figure 1:
FIG. 1 is a view illustrating a system for controlling an in-vehicle environment based on the purpose of using a vehicle according to a first embodiment of the present disclosure.

FIG. 1 is a view illustrating a system for controlling an in-vehicle environment based on the purpose of using a vehicle according to a first embodiment of the present disclosure.

The system for controlling an in-vehicle environment based on the purpose of using a vehicle according to the first embodiment of the present disclosure includes: a recognition unit 110 configured to acquire behavioral information of an occupant, in-vehicle voice information, and seat-position information; a determination unit 120 configured to determine a behavioral pattern of the occupant or the purpose of using a vehicle using the information transferred through the recognition unit 110; and a controller 130 configured to control at least one of in-vehicle illumination and a window transparency level according to the purpose of using the vehicle.

The recognition unit 110 analyzes an in-vehicle image based on a camera (infrared light, RGB, ToF or the like) mounted inside the vehicle (on a room mirror, a sun visor, or the like) and acquires the behavioral information of the occupant including at least one of an age of the occupant, gender of the occupant, whether or not the occupant wears accessories (glasses, sunglasses, a hat, or the like), a motion of the occupant, a posture of the occupant, and a facial expression of the occupant. The determination unit 120 learns the behavioral information and builds personalization data. At this point, the determination unit 120 determines a user's behavior (sleeping, meeting, working, reading, eating, or the like) by utilizing image information transferred through the recognition unit 110. The determination unit 120 determines and learns a motion, a posture, an appearance feature, emotional information based on a facial expression, preference information, and the like on the basis of each user of the vehicle and builds the personalization data.

The recognition unit 110 acquires the in-vehicle voice information including at least one of voice, ambient noise, and music, through the use of a voice recognition module made up of a voice recognition microphone. The determination unit 120 learns the voice information and builds the personalization data. At this point, the determination unit 120 determines the number of speakers, an utterance interval, an utterance length, an in-use vocabulary, and the like by utilizing the received voice information, and determines and learns voice of each user, an utterance speed/length, an emotional state based on the voice, a vocabulary, and the like and builds the personalization data.

The recognition unit 110 acquires the seat-position information (spatial recognition information) including at least one of a position, a rotational angle, and a tilting angle of a seat. The determination unit 120 learns the seat-position information and builds the personalization data. At this point, the determination unit 120 determines a current type of vehicle-space usage (a sleeping space type, a working space type, a meeting space type, an eating space type, and the like) by utilizing the received spatial recognition information. The determination unit 120 determines and learns a preferred seat position and seat angle according to each user's purpose of using the vehicle and builds the personalization data.

The determination unit 120 integrates and analyzes image, voice, and spatial recognition information, preference information or build personalization data that are acquired through the recognition unit 110 and derives the user's purpose of using the vehicle.

According to the first embodiment of the present disclosure, by utilizing a result of determination by the determination unit 120 based on the image, voice, and spatial information, it is possible to determine the user's current purpose of using the vehicle. By additionally checking individually customized data, it is possible to improve an accuracy level of estimation of the purpose of using the vehicle and an individual satisfaction level.

The recognition unit 110 further acquires information on the purpose of using the vehicle that is set on a per-time zone basis and on a per-path section basis, and receives input formation that is manually set by the user on a per-time zone basis and on a per-path section basis according to the purpose of using the vehicle.

In a case where the controller 130 controls the in-vehicle illumination, the controller 130 controls the in-vehicle illumination using situational standard-based illumination-level information or preferred-illumination-level information.

By utilizing various illumination devices inside the vehicle, the controller 130 variably controls in-vehicle illumination or controls brightness of various displays (a cluster, a CID, an AVN, and the like) mounted inside the vehicle.

The controller 130 changes a vehicle illumination value based on standard data, such as the KS recommended levels of illumination, according to the purpose of using the vehicle.

The controller 130 controls an illumination level for the in-vehicle illumination, considering a behavioral area of the occupant and a distance between the illumination device and the behavioral area.

In a case where the controller 130 controls the window transparency level, the controller 130 controls the window transparency level on the basis of each purpose of using the vehicle, considering already-acquired usage satisfaction-level information.

The controller 130 performs control using a passive technique and an active technique. In the passive technique, the light of the sun is blocked or is allowed to pass through with insertion into a vehicle window glass lane. In the active technique, it is possible to freely block the light of the sun according to an external illumination environment (an illumination direction or the intensity of illumination). The controller 130 controls the window transparency level by changing a glass transparency level or using electrochromic (EC) for the vehicle.

The controller 130 performs changing to a predefined value of the window transparency level according to the purpose of using the vehicle.

The controller 130 performs control of in-vehicle illumination based on the personalization data or control of the window transparency level. Through learning based on accumulated user data, the controller 130 performs changing to a value of an individually customized illumination level or the value of the window transparency level that is most preferred by the user on the basis of each specific purpose of using the vehicle.

In addition, in a case where the recognition unit 110 receives a user input, the controller 130 controls at least one of the illumination level or the window transparency level based on a purpose or a schedule that is manually set by the user.

FIGS. 2 to 6 are views each illustrating a process of controlling an in-vehicle environment based on the purpose of using a vehicle according to the first embodiment of the present disclosure.

Figure 2:
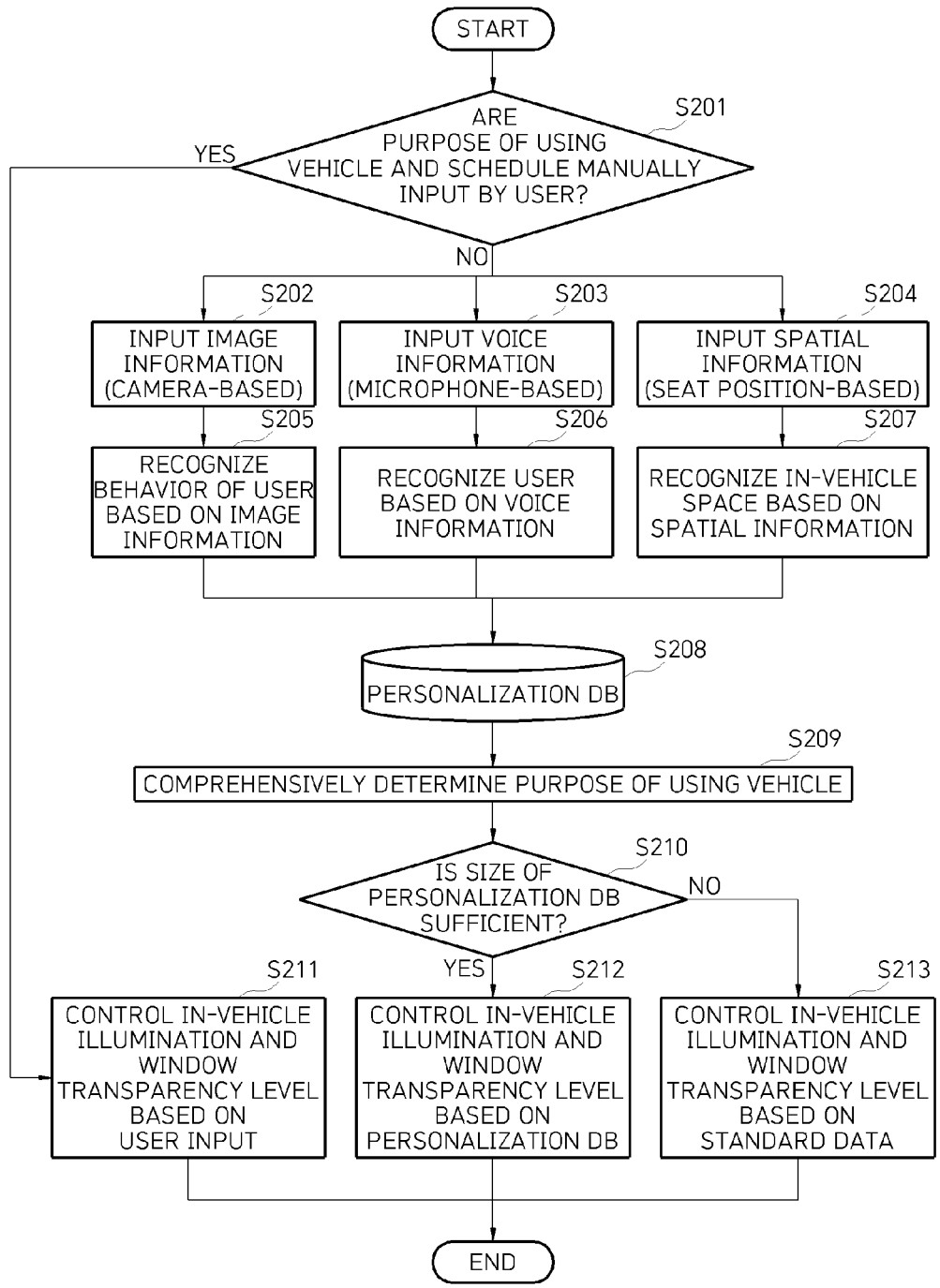
FIGS. 2 to 6 are views each illustrating a process of controlling an in-vehicle environment based on the purpose of using a vehicle according to the first embodiment of the present disclosure.

One Adult Rides in the Vehicle and Sets the Purpose of Using the Vehicle (Sets a Schedule) on a Per-time Zone Basis/on a Per-path Section Basis—FIG. 2

In Step S201, it is checked whether or not the user inputs the purpose of using the vehicle or a schedule.

When it is checked in Step S201 that the user inputs the purpose of using the vehicle or the schedule, in Step S211, the control of the in-vehicle illumination based on the user input and the control of the window transparency level are performed.

At this point, in Step S211, the in-vehicle environment control is performed according to setting information for an entire traveling path (from Seoul to Pusan). In the setting information, a path from Seoul to Cheonan is set as a working section, a path from Cheonan to Daejeon is set as a lunch section, and a path from Daejeon to Pusan is set as a sleeping section.

In Step S211, in the working section, the in-vehicle illumination level and the window transparency level are selected using one of standard, personalization, and direct input.

For example, the user sets an in-vehicle environment control function to be performed in a specific path section of the entire traveling path. When, using GPS positional information, it is checked that a current position of the vehicle is included in the specific path section, the system correspondingly performs the in-vehicle environment control function.

In Step S211, in the lunch time, an audio message, such as "Now is lunch time. Enjoy lunch and relax from the fatigue of the meeting." is provided, and the illumination level and the transparency level are selected using one of the standard, the personalization, and the direct input.

In Step S211, in the sleeping time, an audio message, such as "Now is sleeping time. When the destination is reached, I'll let you know" is provided and the in-vehicle illumination level and the window transparency level are selected using one of the standard, the personalization, and the direct input.

When it is checked in Step S201 that the purpose of using the vehicle and the schedule are not input by the user, the image information is input in Step S202, the voice information is input in Step S203, and the spatial information is input in Step S204.

Subsequently, a behavior of the user is recognized based on the image information in Step S205, the user is recognized based on the voice information in Step S206, and an in-vehicle space is recognized based on the spatial information in Step S207.

In Step S208, a personalization database is built based on a result of the recognition, and in Step S209, the purpose of using the vehicle is comprehensively determined.

In Step S210, it is checked whether or not the personalization data are accumulated so that a size of the personalization database is equal to or greater than a predetermined size.

In Step S212, the control of the in-vehicle illumination and the window transparency level is performed based on the personalization database. In a case where the size of the personalization database is insufficient, in Step S213, the control of the in-vehicle illumination based on standard data and the control of the window transparency level based on standard data are performed.

Figure 3:
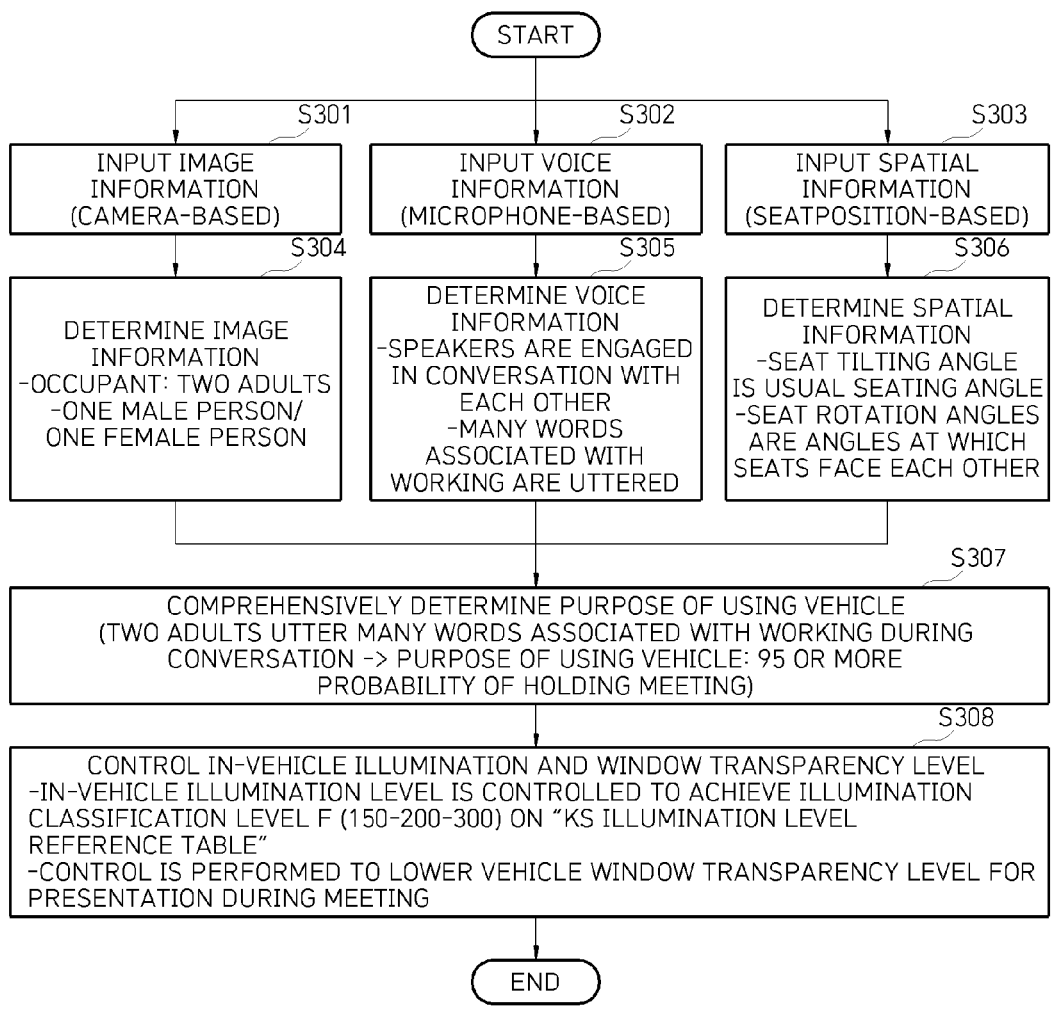

Case where Two Adults Ride in the Vehicle and Have a Meeting at Opposite Positions—FIG. 3

Camera-based image information is received in Step S301, microphone-based voice information is received in Step S302, and seat-position-based spatial information is received in Step S303.

In Step S304, the number of occupants and positions of occupied seats are determined using sensor-based information (occupants are two adults or one male person and one female person).

In Step S305, the voice information is determined using the voice information, and it is determined that the speakers are engaged in a conversation with each other and that words associated with working are uttered during the conversation.

In Step S306, it is determined that a seat tilting angle is a usual seating angle and it is determined that seat rotation angles are angles at which seats are positioned to face each other.

In Step S307, using a result of the determination of the image information, a result of the determination of the voice information, and a result of the determination of the spatial information, it is determined that two adults sitting on seats utter many words associated with working while facing each other. Consequently, it is comprehensively determined that the vehicle is currently used as a meeting room.

Since it is comprehensively determined that the vehicle is currently used as a meeting room for working, in Step S308, control of the in-vehicle illumination level is performed to achieve the meeting room illumination classification level F (150-200-300) on the "KS Illumination Level Reference Table."

In addition, in Step S308, according to comprehensive determination that the vehicle is currently used as a meeting room, control is performed with a predefined value of a window transparency level recommended for a meeting room.

At this point, in Step S308, in a presentation situation, the window transparency level is set to be lowered to a preset numerical value (0%) in order to improve the visibility of presentation data.

In addition, in Step S308, the brightness of the display inside the vehicle is also adjusted to a preset value consistent with the purpose of using the vehicle.

Figure 4:
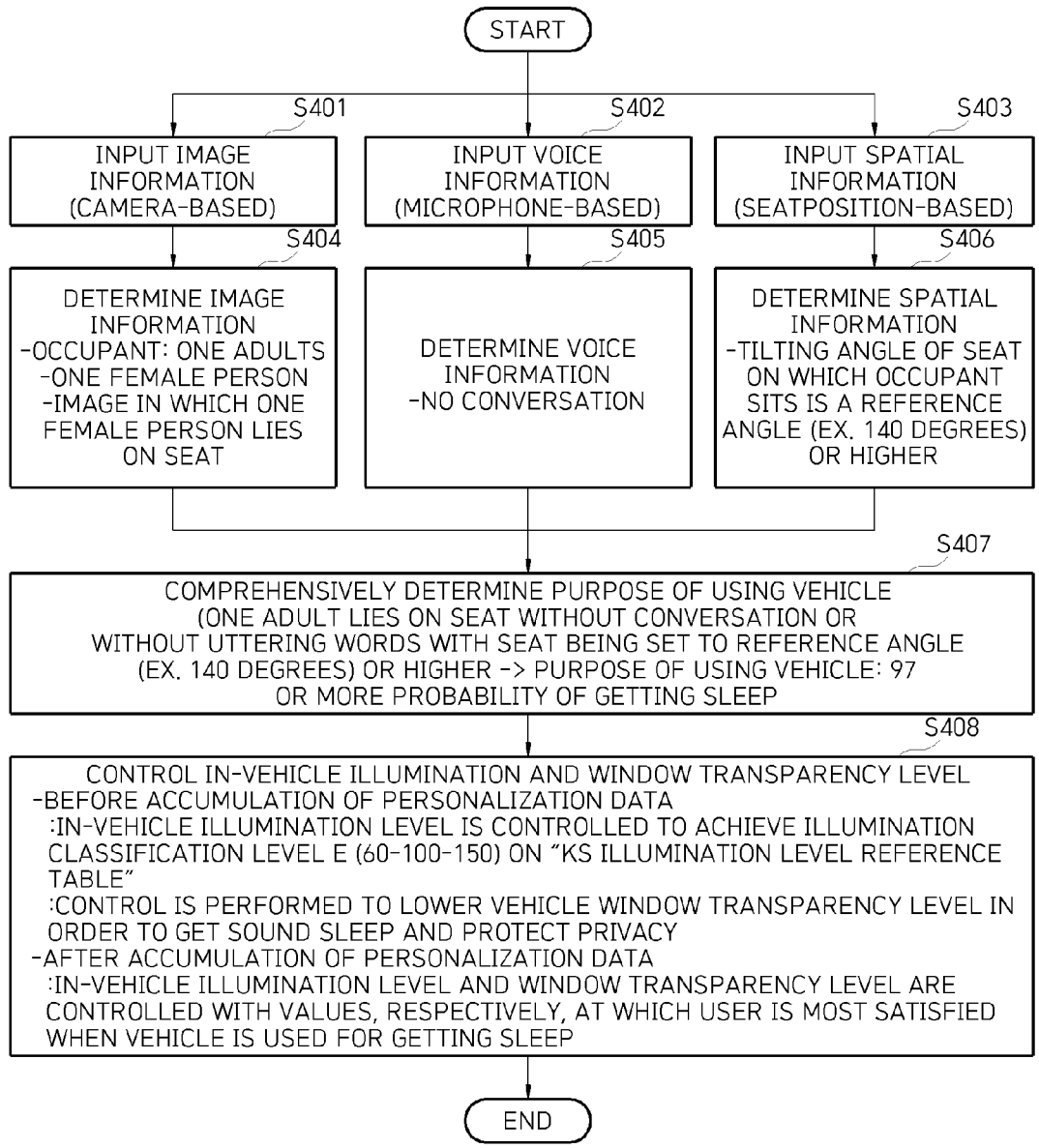

Case where One Adult Rides in the Vehicle and Gets Sleep—FIG. 4

The camera-based image information is received in Step S401, the microphone-based voice information is received in Step S402, and the seat-position-based spatial information is received in Step S403.

In Step S404, it is determined that one adult, an occupant, lies on a seat.

In Step S405, it is determined that the situation is that there is no conversation.

In Step S406, it is determined that a tilting angle of an occupant seat is equal to or greater than a reference angle.

In Step S407, comprehensively considering the results of the determination in Steps S404, S405, and S406, it is determined that the vehicle is used for getting sleep.

In Step S408, in a situation where the personalization data are accumulated, control is performed in such a manner that the in-vehicle illumination level and the window transparency level are changed to values, respectively, at which the user is most satisfied when the vehicle is previously used for getting sleep.

In Step S408, in a case where the personalization data are not accumulated, the control of the in-vehicle illumination level is performed to achieve the illumination classification level E (60-100-150) on the KS Illumination Level Reference Table, and control is performed to lower the vehicle window transparency level in order for the user to get sound sleep and protect privacy.

Figure 5:
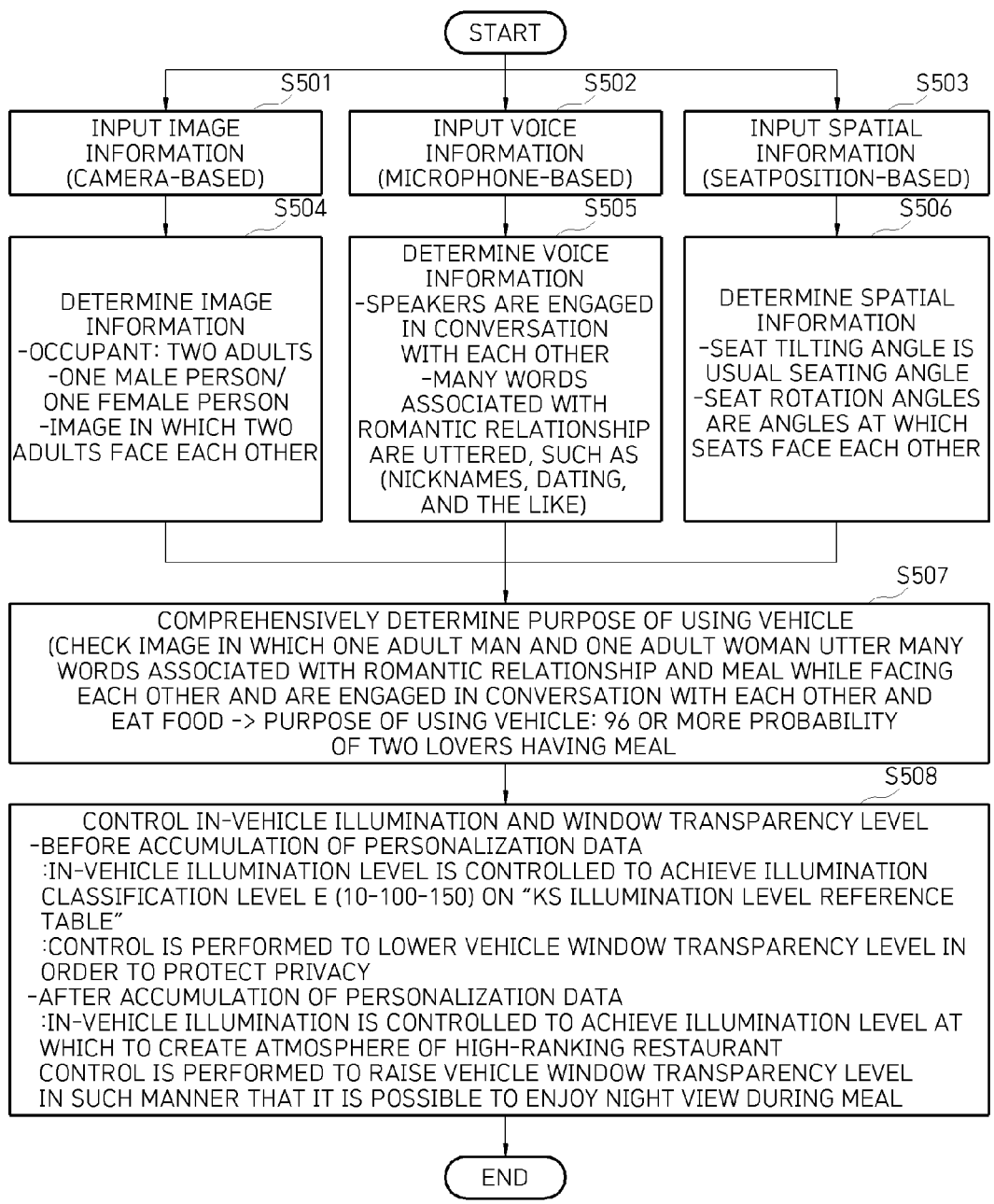

Case where Lovers Ride in the Vehicle and Have Dinner—FIG. 5

The camera-based image information is received in Step S501, the microphone-based voice information is received in Step S502, and the seat-position-based spatial information is received in Step S503.

In Step S504, it is determined that the situation is that two adults (one male person and one female person), occupants, have a meal at opposite positions.

In Step S505, it is determined that the situation is that the speakers are engaged in a conversation with each other and that words associated with a romantic relationship and words associated with a meal are uttered.

In Step S506, the tilting angle of the occupant seat is a usual seating angle, and the seat rotation angles are angles at which seats face each other.

In Step S507, comprehensively considering the results of the determination in Steps S504, S505, and S506, it is determined that the vehicle is used for lovers to have a meal.

In Step S508, when the personalization data are accumulated, the in-vehicle illumination level is controlled to achieve an illumination level that is usually used at a high-class restaurant, and control is performed to raise the vehicle window transparency level in such a manner that it is possible to enjoy a night view during the meal.

In Step S508, in a case where the personalization data are not accumulated, the control of the in-vehicle illumination level is performed to achieve the illumination classification level E (60-100-150) on the KS Illumination Level Reference Table, and control is performed to lower the vehicle window transparency level in order for the occupant to protect his/her privacy.

Figure 6:
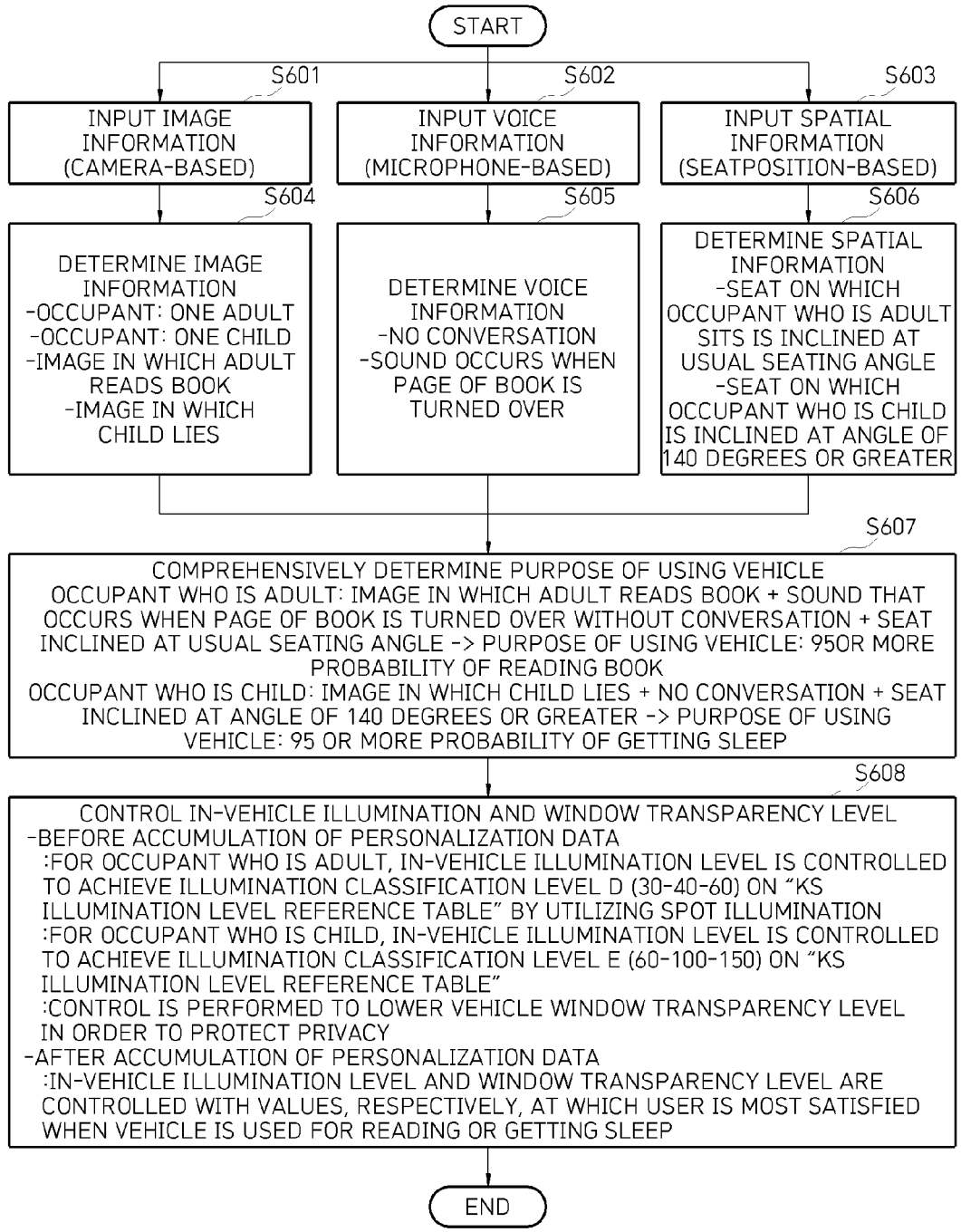

Case where One Adult and One child Ride in the Vehicle, the Adult Reads, and the Child Gets Sleep—FIG. 6

The camera-based image information is received in Step S601, the microphone-based voice information is received in Step S602, and the seat-position-based spatial information is received in Step S603.

In Step S604, it is determined that the situation is that one adult, an occupant, reads a book and one child, an occupant, lies.

In Step S605, it is determined that the situation is that there is no conversation except that sound occurs when the page of a book is turned over.

In Step S606, it is determined that the situation is that a seat on which the adult, an occupant, sits is at a usual seating angle and that a seat on which the child, an occupant, sits is reclined at a preset angle or greater.

In Step S607, comprehensively considering the results of the determination in Steps S604, S605, and S606, it is determined that the vehicle is used for reading and for getting sleep.

In Step S608, in a situation where the personalization data are accumulated, control is performed in such a manner that the in-vehicle illumination level and the window transparency level are changed to values, respectively, at which the user is most satisfied when the vehicle is previously used for reading and for getting sleep.

In Step S608, in a case where the personalization data are not accumulated, by utilizing spot lighting, the in-vehicle illumination level is controlled for the adult to achieve the illumination classification level D (30-40-60) on the KS Illumination Level Reference Table, and by utilizing spot lighting, the in-vehicle illumination level is controlled for the child to achieve the illumination classification level E (60-100-150) on the KS Illumination Level Reference Table and control is performed to lower the vehicle window transparency level in order for the occupant to protect his/her privacy.

A method of controlling an in-vehicle environment based on the purpose of using a vehicle according to a second embodiment of the present disclosure may be implemented on a computer system or recorded on a recording medium. The computer system may include at least one processor, a memory, a user input device, a data communication bus, a user output device, and a storage device. The above-described constituent elements perform data communication with each other through the data communication bus.

The method of controlling an in-vehicle environment based on the purpose of using a vehicle according to the second embodiment of the present disclosure includes: a step (a) of acquiring behavioral information of an occupant, in-vehicle voice information, and seat-position information; a step (b) of determining a behavioral pattern of the occupant or the purpose of using a vehicle using the information acquired in the step (a); and a step (c) of controlling at least one of in-vehicle illumination and a window transparency level according to the purpose of using the vehicle that is determined in the step (b).

In the step (a), an in-vehicle image is analyzed, the behavioral information of the occupant including at least one of an age of the occupant, the gender of the occupant, whether or not the occupant wears accessories, a motion of the occupant, a posture of the occupant, and a facial expression of the occupant is acquired, the in-vehicle voice information including at least one of voice, ambient noise, and music is acquired using a voice recognition module, the seat-position information including at least one of a position, a rotational angle, and a tilting angle of a seat is acquired, and personalization data are built.

In the step (b), the purpose of using the vehicle is determined using history information that is already acquired on a per-time basis and on a per-path section basis.

In the step (c), in a case where the in-vehicle illumination is controlled, the in-vehicle illumination is controlled using situational standard-based illumination-level information or preferred-illumination-level information.

In the step (c), an illumination level for the in-vehicle illumination is controlled, considering a behavioral area of the occupant and a distance between an illumination device and the behavioral area.

In the step (c), the in-vehicle illumination is controlled, considering outside-illumination level information and setting information for the window transparency level.

In the step (c), in a case where the window transparency level is controlled, the window transparency level may be controlled on the basis of each purpose of using the vehicle, considering already-acquired usage satisfaction-level information.

The computer system may further include a network interface coupled to a network. The processor may be a central processing unit (CPU) or may be a semiconductor device that processes a command stored in the memory and/or the storage device.

Examples of the memory and the storage device may include various types of volatile or non-volatile storage media. Examples of the memory may include a ROM and a RAM.

Therefore, the method of controlling an in-vehicle environment based on the purpose of using a vehicle according to the second embodiment of the present disclosure may be realized in a manner that is performable on a computer. When the method of controlling an in-vehicle environment based on the purpose of using a vehicle according to the second embodiment of the present disclosure is performed on a computer apparatus, the method of controlling an in-vehicle environment based on the purpose of using a vehicle may be performed using computer-readable commands.

It is possible that the method of controlling an in-vehicle environment based on the purpose of using a vehicle according to the present disclosure are realized as computer-readable codes on a computer-readable recording medium. The computer-readable recording media includes all types of recording media on which computer system-readable data are stored. Examples of the computer-readable recording medium may include a read only memory (ROM), a random access memory (RAM), a magnetic tape, a magnetic disk, a fresh memory, an optical data storage device, and the like. In addition, the computer-readable recording media on each of which the method of controlling an in-vehicle environment based on the purpose of using a vehicle is recorded as computer-readable codes may be distributed to computer systems connected over a computer network, and the computer-readable codes may be stored and implemented on the computer systems.

According to the second embodiment of the present disclosure, even in a situation where an occupant does not focus on driving, such as when reading a book, enjoying hobby activities, using a mobile phone, and utilizing an infotainment function, the occupant can intuitively recognize traveling situation information and traffic situation information through a color and a pattern of ambient light that are identifiable with peripheral vision.

According to third and fourth embodiments of the present disclosure, there are provided a system for and a method of providing traffic situation guidance to an autonomous vehicle using V2I communication-dependent ambient light.

Various colors may represent different images in an in-vehicle interior design, add the exclusiveness of a vehicle, and exemplify features of interior decoration that evoke a sentiment and an emotion in a driver.

Ambient light in the related art provides a fusion of light and various colors. However, there is a limitation in that the ambient light depends on user setting without providing various services, such as an active change that results from considering a traveling environment and the like.

The system for providing traffic situation guidance to an autonomous vehicle using V2I communication-dependent ambient light according to the third embodiment of the present disclosure includes a recognition unit 210 configured to input vehicle traveling information and traffic situation information acquired through V2I communication, a determination unit 220 configured to determine, using the vehicle traveling information and the traffic situation information, whether or not a current situation corresponds to a guidance-needing situation that uses ambient light, and a controller 230 configure to control output of the ambient light in the guidance-needing situation.

The recognition unit 210 acquires the vehicle traveling information including a traveling-vehicle position and traveling path information.

The recognition unit 210 acquires the traffic situation information including at least one of traffic-light information, construction-section information, accident-section information, and emergency vehicle information.

The determination unit 220 determines whether or not the presence or absence of a school zone, the presence or absence of a silver zone, the occurrence or non-occurrence of a lane change, the occurrence or non-occurrence of a stop due to a traffic signal, the presence or absence of a construction work, the occurrence or non-occurrence of an accident, or the occurrence or non-occurrence of an emergent situation corresponds to an already-categorized case.

The controller 230 changes a color or an output pattern of the ambient light and provides an occupant with information on the guidance-needing situation.

The controller 230 performs control in such a manner that preset voice information on the guidance-needing situation is provided.

The method of providing traffic situation guidance to an autonomous vehicle using V2I communication-dependent ambient light according to the fourth embodiment of the present disclosure includes a step (a) of acquiring vehicle traveling information and traffic situation information, a step (b) of categorizing guidance-needing cases based on the vehicle traveling information and the traffic situation information, and a step (c) of changing a color and an output pattern of ambient light on a per-case basis.

In the step (a), the vehicle traveling information including a current position of a vehicle and traveling path data is acquired.

In the step (a), the traffic situation information including traffic-light information, construction-section information, accident-section information, and emergency vehicle departure information that are acquired from an infrastructure are acquired through V2I communication.

In the step (b), it is determined whether or not the presence or absence of a school zone, the presence or absence of a silver zone, the occurrence or non-occurrence of the need to change a vehicle lane, the occurrence or non-occurrence of the need to stop the vehicle due to a traffic signal, the presence or absence of a road construction section, the presence or absence of an accident section, or the occurrence or non-occurrence of an emergent situation corresponds to an already-categorized case.

In the step (c), voice guidance associated with guidance information provided by changing a color and an output pattern of the ambient light is provided.

According to the third and fourth embodiments of the present disclosure, even in a case where the occupant does not look straight in front, the effect of supporting the reliability of an autonomous traveling system is provided. Even in situations, such as reading a book, enjoying hobby activities, using a mobile phone, and utilizing an infotainment function, traveling situation and traffic situation can be recognized through the color and the pattern of the ambient light that are identifiable with peripheral vision. Thus, the effect of minimizing the occupant's anxiety is provided.

According to the third and fourth embodiments of the present disclosure, the occupant can much more focus on reading a book, enjoying hobby activities, using a mobile phone, and the like, on the basis of the high reliability of the autonomous traveling system. Thus, the effect of increasing the user satisfaction is provided.

According to the third and fourth embodiments of the present disclosure, although the occupant does not focus on driving, the occupant can recognize the traveling situation and the traffic situation through the color and the pattern of the ambient light that is seen with peripheral vision. Thus, anxiety about the traveling situation can be minimized, and the reliability of autonomous traveling can be provided. Accordingly, the occupant may have confidence in the Lv. 4 or higher autonomous traveling system without the driver's intervention. It is possible that the occupant much more focuses on leisure activities during vehicle traveling.

Figure 7:
FIG. 7 is a view illustrating a system for providing traffic situation guidance to an autonomous vehicle using V2I communication-dependent ambient light according to a third embodiment of the present disclosure.

FIG. 7 is a view illustrating the system for providing traffic situation guidance to an autonomous vehicle using V2I communication-dependent ambient light according to the third embodiment of the present disclosure.

According to the third embodiment of the present disclosure, in a Lv. 4 or higher autonomous vehicle, guidance for the traveling situation and guidance for the traffic situation are provided according to a change in the color of the ambient light.

The recognition unit 210 collects a current position of the autonomous vehicle and the traveling path data (navigation data) by utilizing a GPS.

The recognition unit 210 acquires information on the traffic situation (a signal, traffic congestion, a construction work, an accident, firefighting, an ambulance traveling, or the like) from the nearest infrastructure on the basis of the current position of the autonomous vehicle. At this point, the recognition unit 210 collects information on a traffic light near the vehicle, a position of each of the traffic lights, the time for turning to the red, yellow, blue, and left-turn signal, information on a location of a road under construction, information on a location of an accident and a type thereof, information on a fire truck traveling, information on an ambulance traveling, and a traveling path data.

The determination unit 220 determines on the basis of the current position of the autonomous vehicle and the traveling path data whether or not a lane change is necessary (for example, a left or right turn 300 m ahead, a branching road or merging roads, changing to a lane for traveling in a straight line, or the like) or whether or not there is a caution-of-driving area, such as a child protection area or an elderly person protection area.

The determination unit 220 determines whether or not the vehicle may pass through an intersection before a current go-straight signal finishes, by utilizing data on a traveling path for the autonomous vehicle and on a traffic light at an intersection infrastructure on the basis of GPS data and infrastructure data acquired through the V2I communication, and then determines whether or not the situation is that the vehicle has to come to a stop at the intersection. In a case where a distance D to the end of the intersection is great, when taking into consideration a current speed V of the vehicle and a time T to traffic signal change, the determination unit 220 determines that the situation is that the vehicle needs to come to a stop.

By utilizing the data on the traveling path for the autonomous vehicle and data on a road under construction and an accident, the determination unit 220 determines whether or not the situation is that a warning has to be provided to an occupant.

The determination unit 220 checks whether or not the traveling path for the autonomous vehicle is the same as an expected path for an emergency vehicle (a fire truck or an ambulance) that is acquired from the infrastructure, and determines whether or not the situation is that a warning has to be provided.

The controller 230 provides a function of turning on/off the ambient light. The controller 230 provides a control function on the basis of each case that results from the determination by the determination unit 120, using a sequential output mode and a color change mode.

The controller 230 provides a voice announcement together in such a manner that the occupant can acoustically recognize a situation that varies with a change in the color and the pattern of the ambient light (for example, in the case of a school zone, a silver zone, a construction work, an accident, and the like, it is possible to utilize a voice guidance function of a navigation in the related art).

In a situation of changing a vehicle lane, a situation of traveling along a school zone, a situation of stopping the vehicle due to a traffic signal, a situation of providing a warning due to a road under construction or an accident, and a situation of traveling along the same path as an emergency vehicle, examples where the ambient light and the voice guidance according to the third and fourth embodiments of the present disclosure are primarily utilized are as follows.

Situation of Changing a Vehicle Lane

Figure 8:
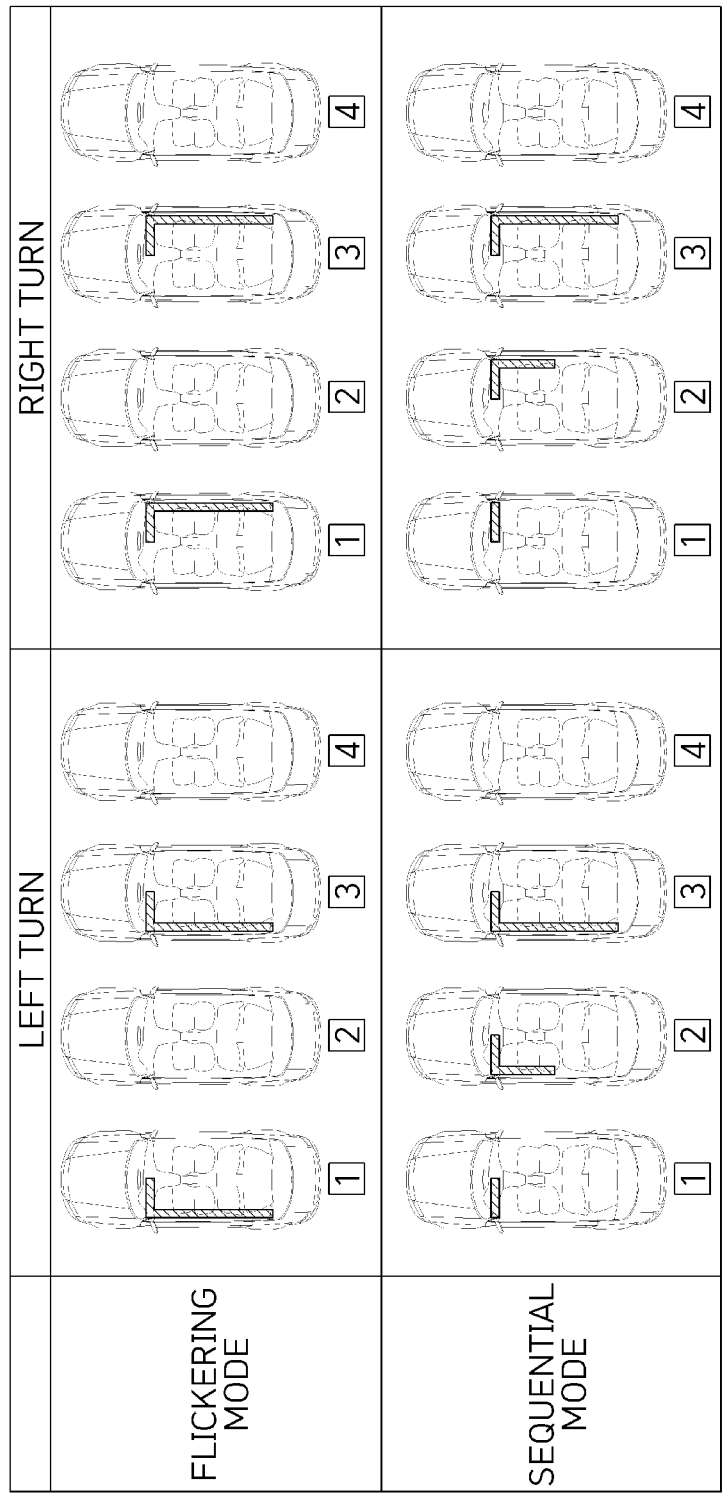
FIG. 8 is a view illustrating an example of utilizing ambient light in a situation of changing a vehicle lane according to the third embodiment of the present disclosure.

A practical example in the situation of changing a vehicle lane will be described below referring to FIG. 8.

In a case where the situation is that a vehicle lane needs to be changed on the traveling path for the autonomous vehicle, the controller 230 changes a color of the ambient light to a preset color (a yellow color) in advance of actually changing a vehicle lane, and actually turns on the ambient light in a pattern that is the same as that of a winker (a flickering mode) or, by performing control in a sequential output mode, alerts the occupant to the situation of changing a vehicle lane.

At this point, the ambient light is controlled in conjunction with the pattern of the winker, and control is performed in such a manner as to provide voice guidance together, such as "Make a left turn 300 m ahead, "Move in the 00 direction at the 00 branch road," and "Move to a lane for traveling in a straight line.

Situation of Traveling Along a School Zone

Figure 9:
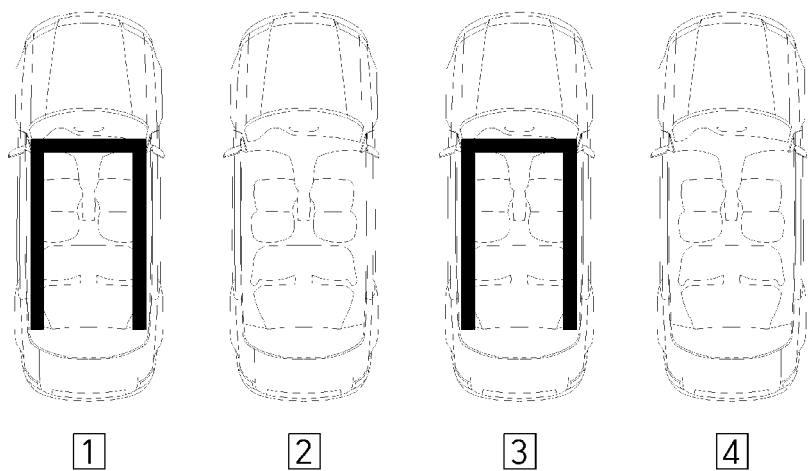
FIG. 9 is a view illustrating an example of utilizing the ambient light in a situation of traveling along a school zone according to the third embodiment of the present disclosure.

A practical example in the situation of traveling along a school zone will be described below referring to FIG. 9.

When the autonomous vehicle travels along the school zone, the controller 230 performs control in such a manner that the autonomous vehicle travels at a reduced speed. Furthermore, in order to alert the user to a situation where it is necessary to prepare for an emergent situation (for example, the occurrence of a sudden stop or the like when children abruptly run to a road), the controller 230 changes the color of the ambient light to a preset color (a red color) and causes the ambient light to flicker. At this point, the controller 300 performs control in such a manner that the voice guidance, such as "A child protection area is 300 m ahead" is provided together.

Situation of Stopping the Vehicle Due to a Traffic Signal

Figure 10:
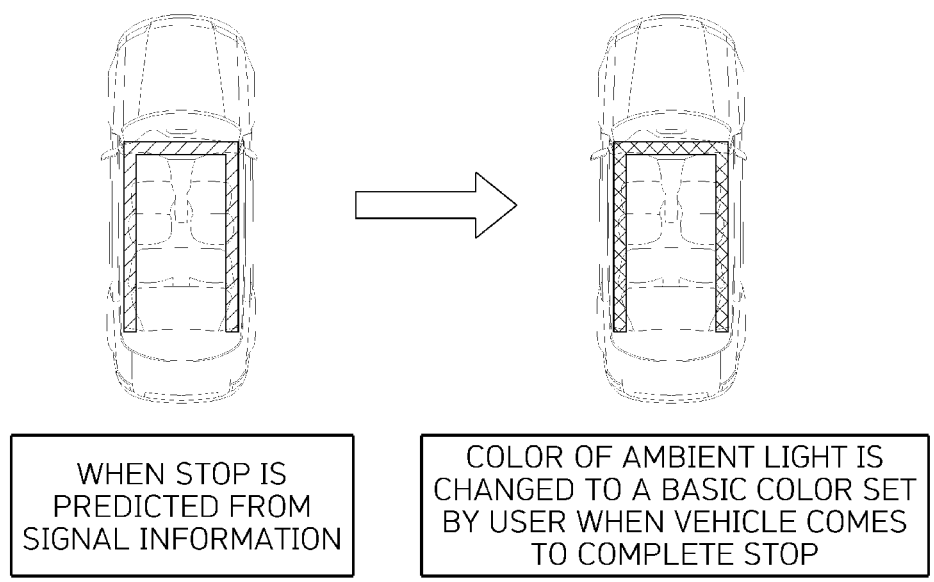
FIG. 10 is a view illustrating an example of utilizing the ambient light in a situation of stopping a vehicle due to a traffic signal according to the third embodiment of the present disclosure.

A practical example in the situation of stopping the vehicle due to a traffic signal will be described below referring to FIG. 10.

When it is expected that a traffic light located ahead in a direction in which the autonomous vehicle travels will soon change to an orange color and it is accordingly determined that the autonomous vehicle needs to come to a stop, the controller 230 changes the color of the ambient light to a preset color (a yellow or orange color) and, when the autonomous vehicle comes to a complete stop, changes the color of the ambient light to an original color (a color that the user sets, for example, a purple color), thereby guiding the user in dealing with a traffic situation associated with the traffic signal.

At this point, control is performed in such a manner as to provide voice guidance together, such as "The traffic light changes to a red signal 300 m ahead and the vehicle comes to a stop n seconds later."

In addition, while the autonomous vehicle waits at the intersection, a traffic light color indicating a traveling direction is displayed on the ambient light, and thus the driver can recognize that the autonomous vehicle waits at the intersection until the traffic signal changes.

Figure 11:
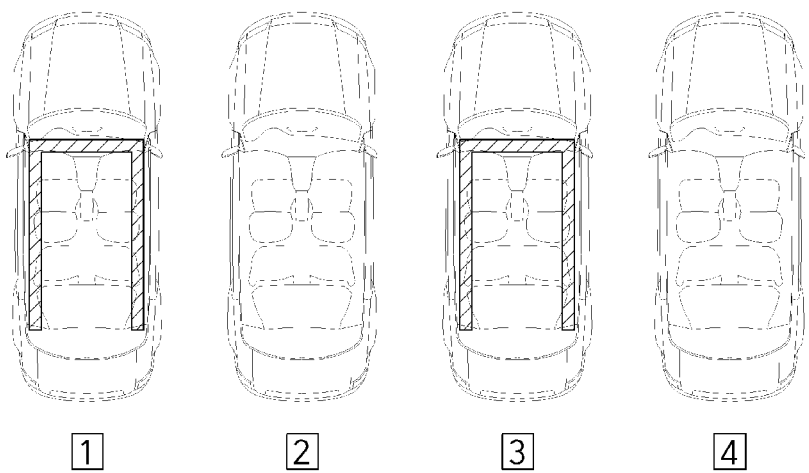
FIG. 11 is a view illustrating an example of utilizing the ambient light in a situation of providing a warning due to a road under construction or an accident according to the third embodiment of the present disclosure.

Situation of Providing a Warning Due to a Road Under Construction or an Accident A practical example in the situation of providing a warning due to a road under construction or an accident will be described below referring to FIG. 11.

When receiving information on a traffic accident on the traveling path and information of Korea Expressway Corporation and the like from the infrastructure during autonomous traveling, in order to alert the user to a situation where attention has to be paid to driving because traffic congestion may occur in front, the controller 230 performs control in such a manner that the color of the ambient light is changed to a preset color (a yellow or orange color) and that the ambient light flickers. At this point, control is performed in such a manner as to provide voice guidance together, such as "Road is under construction 1 km ahead on the first lane, so please careful driving," "Traffic congestion occurred due to an accident 1 km ahead, so please careful driving," or "Noise may occur due to a road under construction ahead."

Situation where the Vehicle Travels along the Same Path as an Emergency Vehicle

Figure 12:
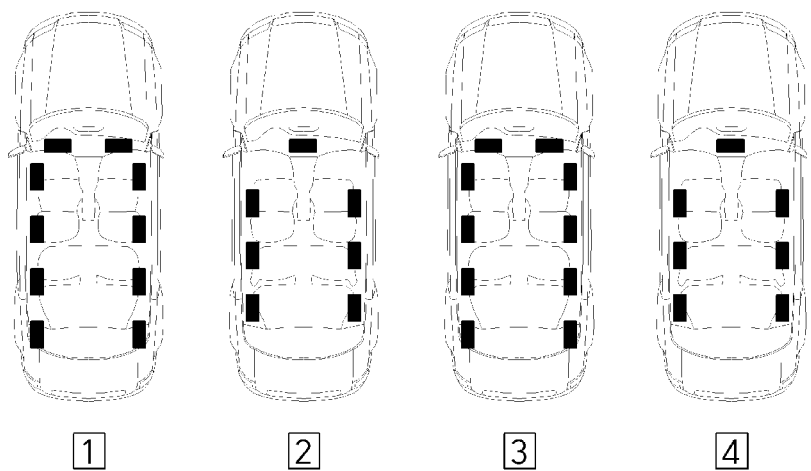
FIG. 12 is a view illustrating an example of utilizing the ambient light in a situation of traveling along the same path as an emergency vehicle according to the third embodiment of the present disclosure.

A practical example in the situation where the vehicle travels along the same lane as an emergency vehicle will be described referring to FIG. 12.

When the traveling path for the autonomous vehicle during autonomous traveling is the same as a traveling path for the emergence vehicle that is acquired from the infrastructure, in order to alert the user to a situation that the traveling path for the emergence vehicle has to be secured, the controller 230 changes the color of the ambient light to a preset color (a red color) and causes the ambient light to actually flicker in the same cross pattern as an ambulance. At this point, control is performed in such a manner as to provide voice guidance together, such as "The traveling path for the autonomous vehicle is the same as the traveling path for the emergency vehicle, so the autonomous vehicle has to give way to the emergency vehicle."

Figure 13:
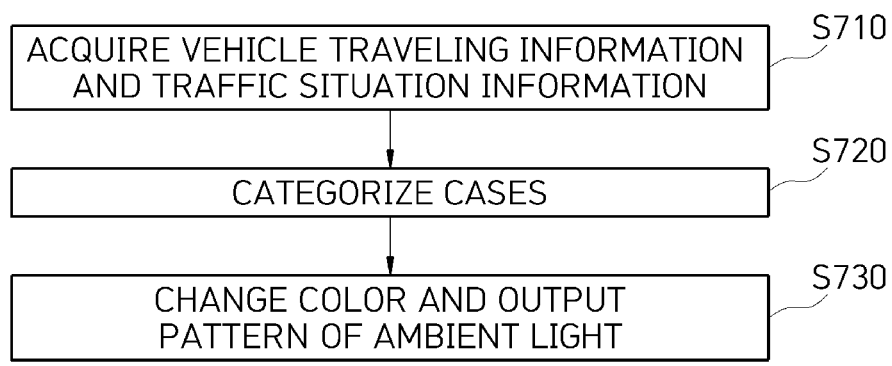
FIG. 13 is a view illustrating a method of providing traffic situation guidance to an autonomous vehicle using V2I communication-dependent ambient light according to a fourth embodiment of the present disclosure.

FIG. 13 is a view illustrating the method of providing traffic situation guidance to an autonomous vehicle using V2I communication-dependent ambient light according to the fourth embodiment of the present disclosure.

The method of providing traffic situation guidance to an autonomous vehicle using V2I communication-dependent ambient light according to the fourth embodiment of the present disclosure includes Step S710 of acquiring vehicle traveling information and traffic situation information, Step S720 of categorizing guidance-needing cases based on the vehicle traveling information and the traffic situation information, and Step S730 of changing a color or an output pattern of ambient light on a per-case basis.

In Step S710, a current position of the vehicle and traveling path data are collected as the vehicle traveling information, using GPS data.

In Step S710, traffic-light information (signal information, positional information, the remaining time to for signal changing, and the like), construction-section information, accident-section information, and emergency vehicle (a fire truck, an ambulance, a police car, and the like) departure information that are acquired from an infrastructure through V2I communication are acquired as the traffic situation information.

In Step S720, it is determined whether or not the presence or absence of a school zone, the presence or absence of a silver zone, the occurrence or non-occurrence of the need to change a vehicle lane, the occurrence or non-occurrence of the need to stop due to a traffic signal, the presence or absence of a road construction section, the presence or absence of an accident section, or the occurrence or non-occurrence of an emergent situation corresponds to an already-categorized case.

In Step S730, in a case where it is determined that the autonomous vehicle is positioned at a section, such as the school zone or the silver zone, where attention is paid to a nearby pedestrian, in order to prepare for a situation where a sudden stop occurs, the color of the ambient light is changed to a preset color (a red color), and the ambient light is caused to flicker. For example, voice guidance, such as "A child protection area is 300 m ahead" is provided together.

In Step S730, in a case where it is determined that the situation is that the vehicle lane needs to be changed, the color of the ambient light is changed to a preset color (a yellow color) in advance of actually changing the vehicle lane, and the ambient light is actually turned on in a pattern that is the same as that of a winker (a flickering mode), or by performing control in a sequential output mode, the occupant is alerted to the situation of changing a vehicle lane. At this point, the ambient light is controlled in conjunction with the pattern of the winker, and control is performed in such a manner as to provide voice guidance together, such as "Make a left turn 300 m ahead, "Move in the oo direction at the oo branch road," and "Move to a lane for traveling in a straight line.

In Step S730, when it is determined that the situation is that the autonomous vehicle needs to come to stop due to a traffic signal (that is, when it is expected that a traffic light located ahead in a direction in which the autonomous vehicle travels will soon change to an orange color and it is accordingly determined that the autonomous vehicle needs to come to a stop), the color of the ambient light is changed to a preset color (a yellow or orange color) and, when the autonomous vehicle comes to a complete stop, the color of the ambient light is changed to an original color (a color that the user sets, for example, a purple color), thereby guiding the user in dealing with a traffic situation associated with the traffic signal. At this point, control is performed in such a manner as to provide voice guidance together, such as "The traffic light changes to a red signal 300 m ahead and the vehicle comes to a stop n seconds later."

In Step S730, in a case where the autonomous vehicle is positioned at the road construction section or the accident section, in order to alert the user to a situation where attention has to be paid to driving because traffic congestion may occur in front, the color of the ambient light is changed to a preset color (a yellow or orange color) and the ambient is caused to flicker. At this point, voice guidance is provided together, such as "Road is under construction 1 km ahead on the first lane, so please careful driving," "Traffic congestion occurred due to an accident 1 km ahead, so please careful driving," or "Noise may occur due to a road under construction ahead."

In Step S730, in the case of an emergent situation (in a case where the autonomous vehicle travels along the same path as an emergency vehicle), in order to alert the user to a situation where a path for the emergency vehicle has to be secured, the color of the ambient light is changed to a preset color (a red color), and the ambient light is caused to actually flicker in the same cross pattern as an ambulance. Furthermore, voice guidance is provided together, such as "The traveling path for the autonomous vehicle is the same as the traveling path for the emergency vehicle, so the autonomous vehicle has to give way to the emergency vehicle."

What is claimed is:

1. A system for controlling an in-vehicle environment based on a purpose of using a vehicle, the system comprising a processor and a memory, wherein the processor is configured to execute a command in the memory to perform:
   acquiring behavioral information of an occupant, in-vehicle voice information, and seat-position information;
   building personalization data based on acquired pieces of information;
   determining a purpose of using a vehicle, using currently acquired pieces of information; and
   controlling at least one of in-vehicle illumination and a window transparency level to have a predefined value according to the purpose of using the vehicle, wherein the predefined value is an individually customized value according to each specific purpose of using the vehicle and the personalization data,
   wherein the controlling comprises:
   determining whether accumulated personalization data has a size equal to or greater than a predetermined size;
   controlling the at least one of the in-vehicle illumination and the window transparency level to have the predefined value that is based on standard data, instead of the personalization data, upon determination that the accumulated personalization data has a size less than the predetermined size; and
   controlling the at least one of the in-vehicle illumination and the window transparency level to have the predefined value that is based on the accumulated personalization data, upon determination that the accumulated personalization data has the size equal to or greater than the predetermined size.

2. The system of claim 1, wherein in the acquiring and the building, the processor is configured to execute the command to analyze an in-vehicle image and acquire the behavioral information of the occupant including at least one of an age of the occupant, a gender of the occupant, whether or not the occupant wears an accessory, a motion of the occupant, a posture of the occupant, and a facial expression of the occupant, and
   wherein the processor is configured to execute the command to learn the behavioral information and build personalization data.

3. The system of claim 1, wherein in the acquiring and the building, the processor is configured to execute the command to:
   acquire the in-vehicle voice information including at least one of voice, ambient noise, and music, using a voice recognition module, and
   learn the in-vehicle voice information and build personalization data.

4. The system of claim 1, wherein in the acquiring and the building, the processor is configured to execute the command to:

acquire the seat-position information including at least one of a position, a rotational angle, and a tilting angle of a seat, and
learn the seat-position information and build personalization data.

5. The system of claim 1, wherein in the acquiring and the building, the processor is configured to execute the command to acquire information on the purpose of using the vehicle, the information being set on a per-time zone basis and on a per-path section basis, and build personalization data using information on the purpose of using the vehicle.

6. The system of claim 1, wherein in a case of controlling the in-vehicle illumination based on the standard data, the in-vehicle illumination is controlled using situational standard-based illumination-level information or preferred-illumination-level information.

7. The system of claim 6, wherein, in the controlling, the processor is configured to execute the command to control an illumination level for the in-vehicle illumination, considering a behavioral area of the occupant and a distance between an illumination device and the behavioral area.

8. The system of claim 1, wherein in a case of controlling the window transparency level based on the accumulated personalization data, the window transparency level is controlled according to each purpose of using the vehicle, considering already-acquired usage satisfaction-level information.

9. A method of controlling an in-vehicle environment based on the purpose of using a vehicle, the method comprising:
    acquiring behavioral information of an occupant, in-vehicle voice information, and seat-position information;
    building personalization data based on acquired pieces of information;
    determining a purpose of using a vehicle using currently acquired pieces of information; and
    controlling at least one of in-vehicle illumination and a window transparency level to have a predefined value according to the purpose of using the vehicle, wherein the predefined value is an individually customized value according to each specific purpose of using the vehicle and the personalization data,
    wherein the controlling comprises:
    determining whether accumulated personalization data has a size equal to or greater than a predetermined size;
    controlling the at least one of the in-vehicle illumination and the window transparency level to have the predefined value that is based on standard data, instead of the personalization data, upon determination that the accumulated personalization data has a size less than the predetermined size; and
    controlling the at least one of the in-vehicle illumination and the window transparency level to have the predefined value that is based on the accumulated personalization data, upon determination that the accumulated personalization data has the size equal to or greater than the predetermined size.

10. The method of claim 9, wherein in the acquiring and the building, personalization data is built by analyzing an in-vehicle image and acquiring the behavioral information of the occupant including at least one of an age of the occupant, a gender of the occupant, whether or not the occupant wears an accessory, a motion of the occupant, a posture of the occupant, and a facial expression of the occupant and by acquiring the in-vehicle voice information including at least one of voice, ambient noise, and music, using a voice recognition module and acquiring the seat-position information including at least one of a position, a rotational angle, and a tilting angle of a seat.

11. The method of claim 9, wherein in the determining, the purpose of using the vehicle is determined using history information that is already acquired on a per-time basis and on a per-path section basis.

12. The method of claim 9, wherein in a case where the in-vehicle illumination is controlled based on the standard data, the in-vehicle illumination is controlled using situational standard-based illumination-level information or preferred-illumination-level information.

13. The method of claim 12, wherein in the controlling, an illumination level for the in-vehicle illumination is controlled, considering a behavioral area of the occupant and a distance between an illumination device and the behavioral area.

14. The method of claim 13, wherein in the controlling, the in-vehicle illumination is controlled, considering outside-illumination level information and setting information on the window transparency level.

15. The method of claim 9, wherein in the controlling, in a case where the window transparency level is controlled based on the accumulated personalization data, the window transparency level is controlled according to each purpose of using the vehicle, considering already-acquired usage satisfaction-level information.

* * * * *